United States Patent
Dziedzic (10) Patent No.: US 6,527,252 B2
(45) Date of Patent: Mar. 4, 2003

(54) SPARE TIRE CARRIER (75) Inventor: Jerzy Dziedzic, Milford, MI (US)

(73) Assignee: Edscha North America, Southfield, MI (US)

( * ) Notice: Subject to any disclaimer, the term of this patent is extended or adjusted under 35 U.S.C. 154(b) by 0 days.

(21) Appl. No.: 09/834,666

(22) Filed: Apr. 13, 2001

(65) Prior Publication Data

US 2002/0149008 A1 Oct. 17, 2002

(51) Int. Cl.7 .............................................. B66D 1/00
(52) U.S. Cl. ................. 254/323; 224/42.12; 224/42.24; 414/466
(58) Field of Search ....................... 254/323; 224/42.12, 224/42.23, 42.2, 42.24, 538; 414/463, 466

(56) References Cited

U.S. PATENT DOCUMENTS

| 3,856,167 | A | | 12/1974 | Yasue et al. ................ 214/451 |
| 4,884,785 | A | | 12/1989 | Denman et al. ............ 254/389 |
| 5,188,341 | A | | 2/1993 | Greaves ...................... 254/323 |
| 5,314,288 | A | * | 5/1994 | Schmidt ...................... 254/323 |
| 5,975,498 | A | | 11/1999 | Sauner ....................... 254/323 |
| 6,079,932 | A | | 6/2000 | Boucher .................... 414/463 |
| 6,092,790 | A | | 7/2000 | Dobmeier et al. .......... 254/323 |
| 6,142,449 | A | * | 11/2000 | Aldridge et al. ......... 224/42.23 |
| 6,267,546 | B1 | * | 7/2001 | Oxyer et al. ................ 254/323 |
| 6,299,403 | B1 | * | 10/2001 | Lee .......................... 224/42.21 |
| 6,390,452 | B1 | * | 5/2002 | Dobmeier et al. .......... 254/270 |

FOREIGN PATENT DOCUMENTS

EP 0501644 * 2/1992 .............. 224/42.23

* cited by examiner

Primary Examiner—Emmanuel Marcelo
(74) Attorney, Agent, or Firm—Rader, Fishman & Grauer PLLC (57) ABSTRACT A spare tire storage assembly is provided for mounting on a vehicle and includes a support member that carries a spare tire, a primary support mechanism, a secondary support mechanism and a release member. A flexible member is connected on one end to the primary support mechanism and on the other end to the support member. The support member and spare tire are elevated by the primary support mechanism to a stowed position within the secondary support mechanism. The secondary support mechanism includes a resiliently biased latch member and an adjacent lance member that are positioned to engage and maintain the support member and spare tire in the stowed position should the primary support mechanism or flexible member fail. The release member is connected to the primary support mechanism and as is provided to engage and pivot the latch member permitting the spare tire to be lowered from the vehicle.

20 Claims, 6 Drawing Sheets

SPARE TIRE CARRIER

FIELD OF THE INVENTION

The present invention relates to a safety latching system for a vehicle and more particularly to a spare tire storage assembly that includes a secondary safety latching apparatus.

BACKGROUND OF THE INVENTION

Underbody spare tire storage systems are well known in the art. A concern of designers of such systems is the possibility that metal components of the systems will corrode or otherwise fail, resulting in a loss of the spare tire. In a number of devices, a secondary support mechanism is employed to prevent the loss of the spare tire should a primary support system fail. Those skilled in the art continue to attempt to improve or enhance current designs of underbody spare tire mechanisms that employ secondary support mechanisms, particularly to increase the load carrying capacity and to improve reliability and ease of use. The present invention provides an effective underbody spare tire carrier having a secondary support mechanism with improved load carrying capacity, reliability and ease of use.

SUMMARY OF THE INVENTION

In accordance with an embodiment of the present invention, a spare tire storage assembly for releasably stowing a spare tire assembly under a vehicle is provided that includes a primary support mechanism, a secondary support mechanism and a support member. The support member includes a connection member and a base that interconnect to engage the hub of a spare tire assembly. A flexible member, such as a cable, is attached on one end to the support member and on the other end to a drum in the primary support mechanism.

The primary support mechanism includes a clutch mechanism, a drum assembly and a drum housing. The clutch mechanism is provided to transfer torque from an input shaft to the drum assembly. The drum assembly includes a drum having a geared recess that cooperates with a wobble gear to create a taumel gear reduction. The clutch mechanism includes an eccentric drive member in communication with the wobble gear in the drum assembly. An input shaft is inserted through the eccentric drive member and causes rotation of the eccentric drive member when the input torque required to operate the assembly is below a predetermined level. The rotation of the eccentric drive causes the wobble gear to wobble, which in turn causes rotation of the drum. The drum housing includes a portion to receive the drum and a channel laterally offset from the input shaft to accommodate the travel of the flexible member as it pays off the drum.

The secondary support mechanism acts as a safety backup latch assembly because it is intended to work in conjunction with the primary support mechanism and the support member. In a preferred embodiment, the secondary support mechanism includes a tube housing, a latch member and a lance member. The tube housing is formed of two structural walls and a back plate that fixedly secures the secondary support mechanism to the primary support mechanism. The latch member is rotatably secured to the back plate and is biased by a resilient member that is secured to the first structural wall. The lance member includes a tapered ramp extending from the distal end of the second structural wall and a support portion for engaging a flanged end of the support member. In the event the primary support mechanism fails, the latch member and lance member cooperate to support the load of the spare tire assembly and to distribute a portion of the load to the adjacent tube housing.

The foregoing spare tire storage assembly provides the advantage of ensuring that the spare tire assembly is not lost in the event the primary support mechanism fails. The combined use of a latch member and lance member is advantageous because it distributes a portion of the load to the adjacent tube housing making the secondary catch mechanism more robust. In addition, the use of a rotatable release member increases the reliability of the secondary support mechanism by eliminating the use of multiple moving parts. Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

DESCRIPTION OF THE PREFERRED EMBODIMENT

Figure 1:
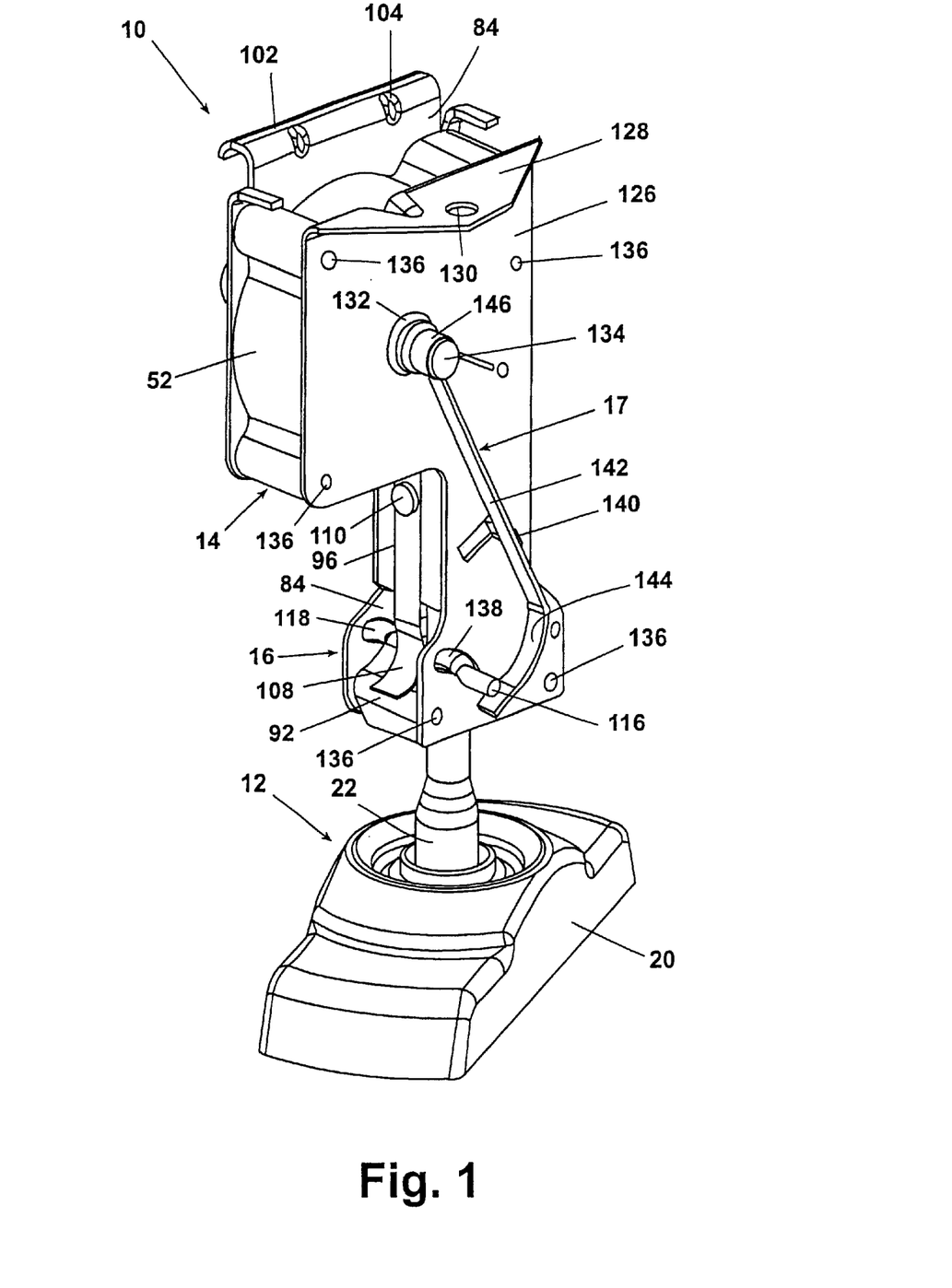
FIG. 1 is a perspective view of an embodiment of the spare tire storage assembly according to the present invention.

Referring now to the drawings, the preferred embodiments of the present invention are described in detail. Referring to FIG. 1, a preferred embodiment of the present invention is shown that includes a spare tire storage assembly 10 having a support member 12, a primary support mechanism 14, a secondary support mechanism 16 and a release member 17. Spare tire storage system 10 is provided for placement beneath a vehicle (not shown) for releasably supporting a spare tire assembly 18; as shown in FIG. 3.

Figure 2:
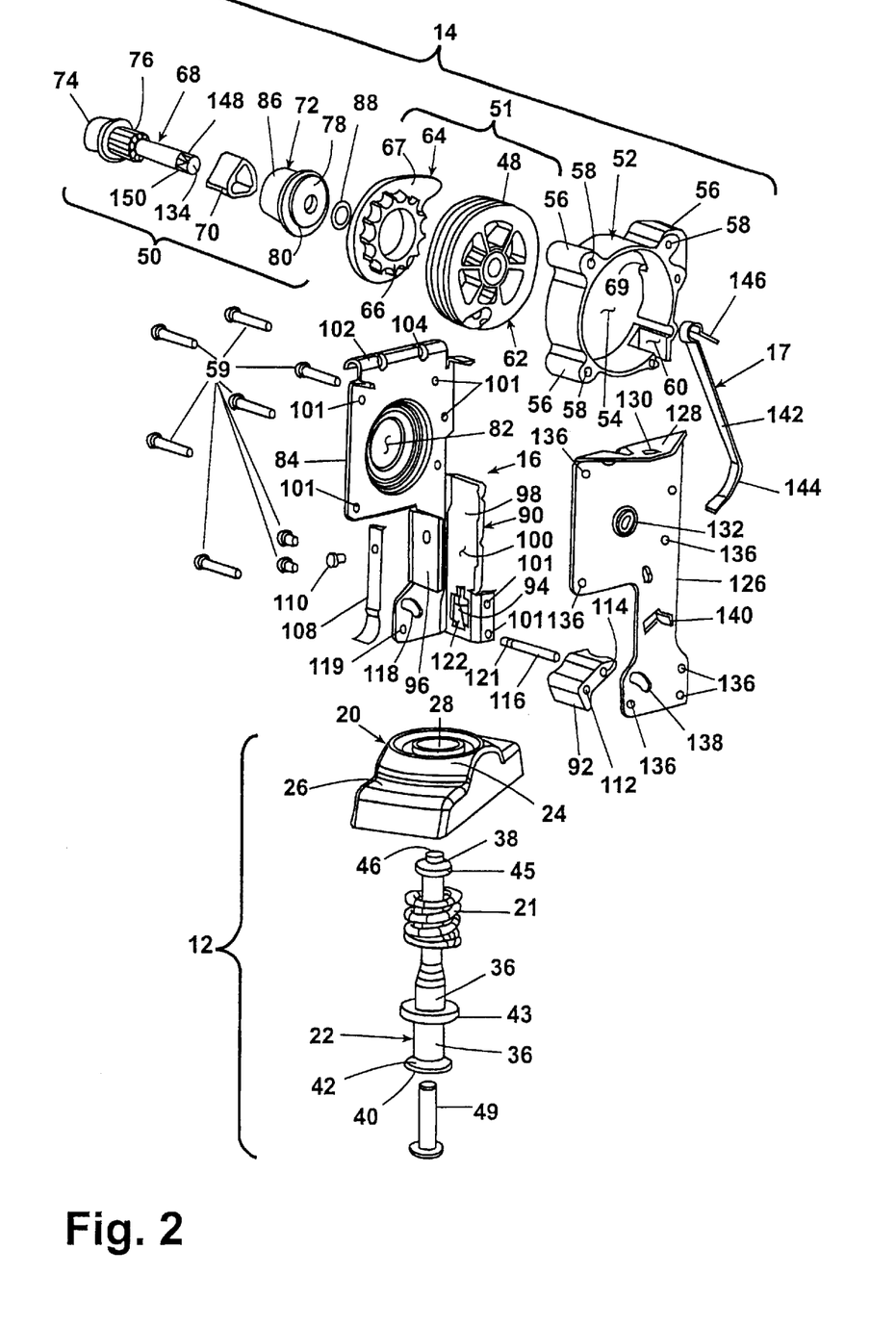
FIG. 2 is an exploded view of the spare tire storage assembly.
Figure 3:
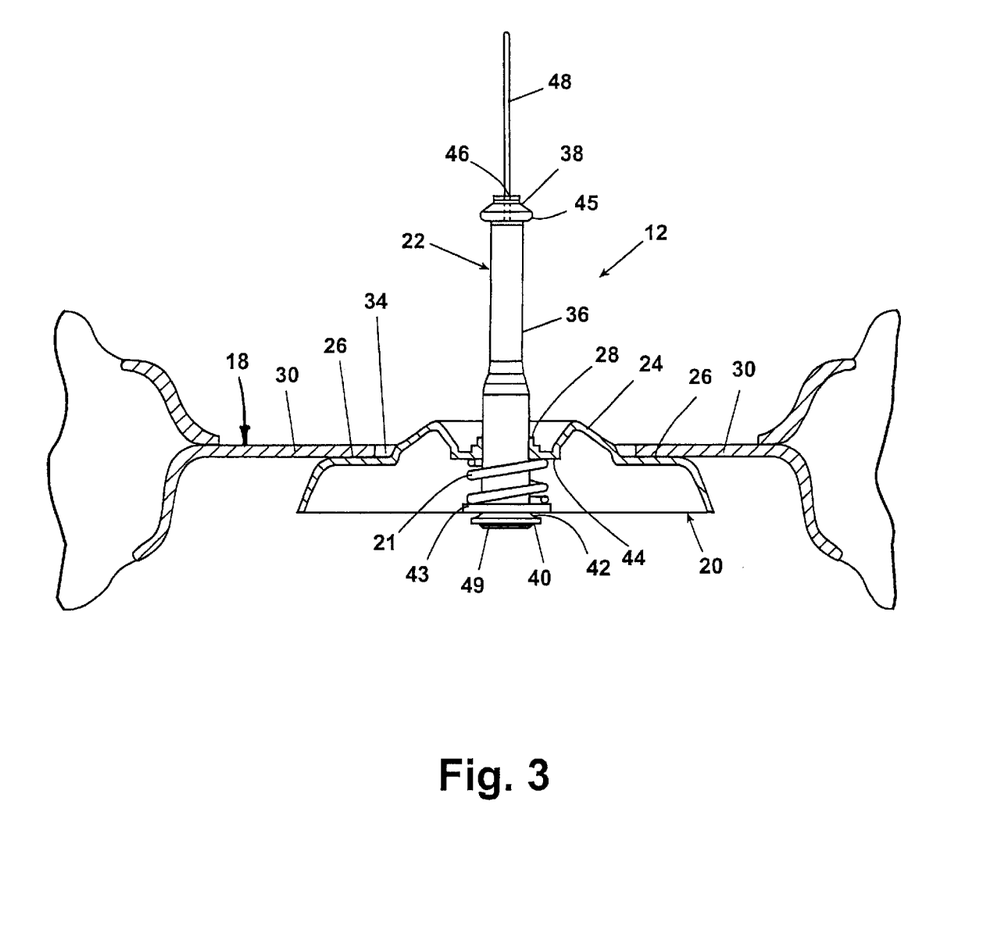
FIG. 3 is a partial sectioned view of the support member positioned within a hub of a spare tire assembly.

Referring to FIGS. 2 and 3, in a preferred embodiment, support member 12 includes a base 20, a compressible member 21 and a connection member 22. Support member 12 is preferably formed from a strong material, such as a steel, a non-ferrous metal such as aluminum or a high-strength plastic, given that it must support spare tire assembly 18 for extended periods of time. Base 20 is preferably formed with an insert portion 24 protruding from a generally flat flange portion 26. Insert portion 24 includes an aperture 28 therethrough for permitting passage of connection member 22. Flat flange portion 26 is designed to engage the underside of a hub portion 30 in spare tire assembly 18 to support the weight of assembly 18. Base 20 is generally narrower in width than an aperture 34 in hub portion 30. This configuration allows base 20 to pass unobstructed through aperture 34 in hub portion 30 to permit the connection of support member 12 to spare tire assembly 18.

Connection member 22 preferably includes a generally cylindrical tube portion 36 having a connecting end 38 and an engagement end 40. Engagement end 40 includes a peripheral flange 42 that engages a washer 43. Compressible member 21 is biased between washer 43 and an underside surface 44 of insert portion 24 to support base 20. Compressible member 21 is compressed as the spare tire assembly 18 is moved to a "stowed position" beneath a vehicle. Compressible member 21 compresses spare tire assembly 18 against the vehicle to minimize jarring or unwanted tire movement. Further, compressible member 21 helps to maintain tire assembly 18 in its stored orientation in the event of tire pressure loss by compensating for reduced tire thickness.

Connecting end 38 includes a flange 45 and an aperture 46 that allows passage of a flexible member 48, such as a metal cable. Upon insertion of flexible member 48 through connection member 22 and base 20, flexible member 48 is secured to a fitting member 49, preferably by a swaged engagement. Fitting member 49 is designed to slide upwardly into connection member 22 to secure flexible member 48 to connection member 22. Similarly, connection member 22 is designed to slide upwardly through washer 43 and compressible member 21 into base 20 through aperture 28. Washer 43 is sized such that connecting end 38 will pass unobstructed through washer 43 but peripheral flange portion 42 will not. The multi-part construction of support member 12 is convenient as the portions may be separated to allow easy removal of support member 12 from spare tire assembly 18.

Referring to FIG. 2, in a preferred embodiment, primary support mechanism 14 includes a clutch mechanism 50, a drum assembly 51 and a drum housing 52. Drum housing 52 is preferably formed of a strong material such as a steel, a non-ferrous material such as aluminum or a high-strength plastic. Drum housing 52 generally includes a receiving portion 54 and a plurality of radially outwardly extending attachment portions 56 each having an aperture 58 therethrough for receiving a fastener 59. Drum housing 52 further includes a channel 60 that is preferably laterally offset from the center of drum assembly 51. During assembly, drum assembly 51 is placed within receiving portion 54 such that flexible member 48 is positioned to pay off drum assembly 51 over channel 60. In this configuration, flexible member 48 may travel without interference between drum assembly 51 and support member 12.

Drum assembly 51 preferably includes a drum 62, having flexible member 48 wound thereon, and a wobble gear 64. Drum 62 includes a recess (not illustrated) having a plurality of teeth that engage a corresponding geared protrusion 66 on wobble gear 64. Preferably, the recess in drum 62 contains one more gear tooth than geared protrusion 66 to create what is known in the art as a planocentric or taumel gear reduction. Wobble gear 64 includes a arm portion 67 that engages a corresponding formation 69 in housing 52 to prevent wobble gear 64 from rotating during operation.

Figure 4:
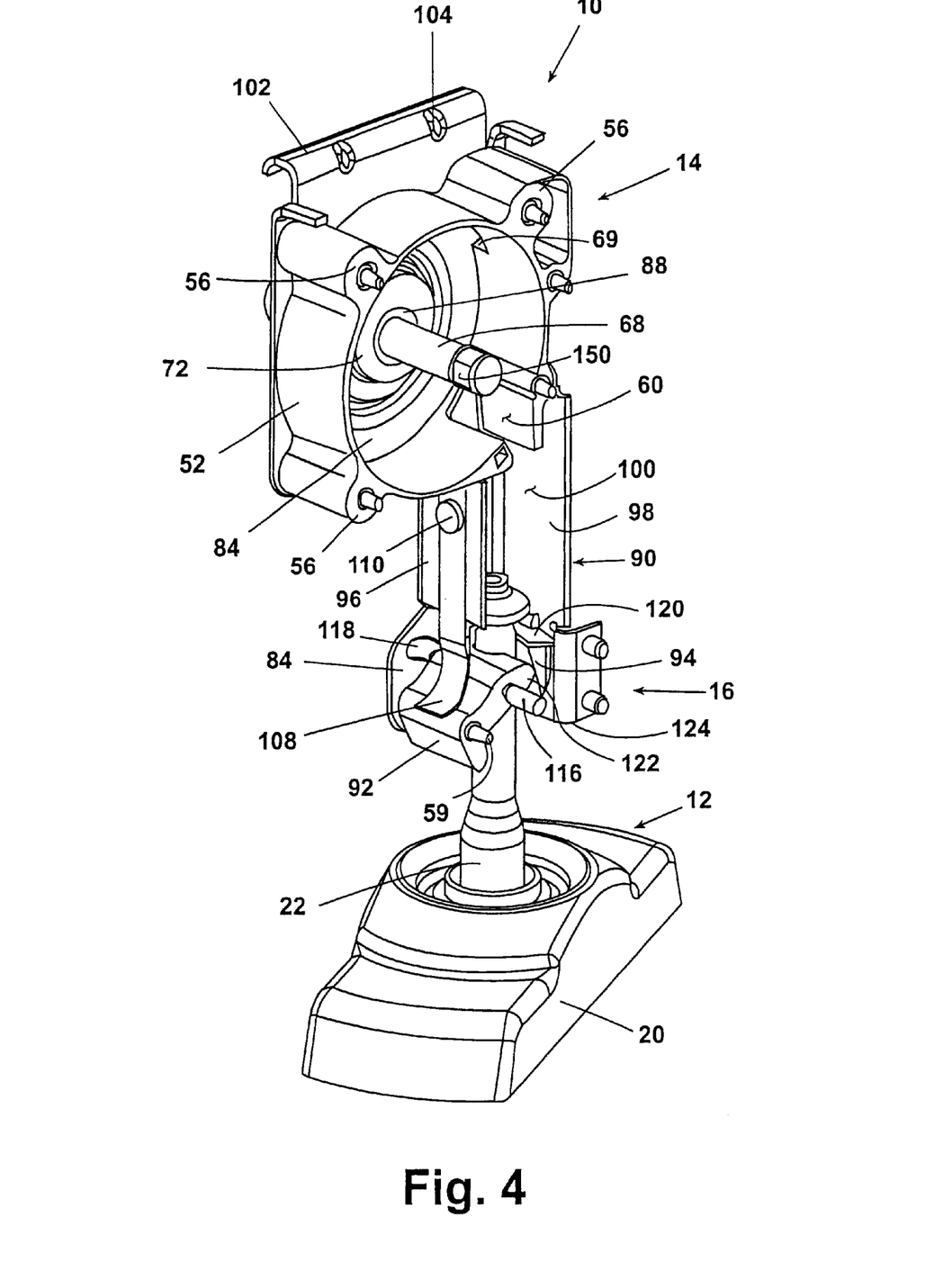
FIG. 4 is a perspective view of the spare tire storage system showing the support member in the "stowed" position with the release member, front plate and drum assembly removed.

Clutch mechanism 50 generally includes an input shaft 68, a resilient leaf member 70, and an eccentric drive member 72. Input shaft 68 generally includes an engagement end 74 for engaging a user input device (not shown) and a cam portion 76. Eccentric drive member 72 includes a protruding cam surface 78 that is eccentrically positioned on a concentric flanged surface 80. As shown in FIGS. 2 and 4, clutch mechanism 50 is assembled into an aperture 82 in a back plate 84 by first inserting a preferably concentric cylindrical portion 86 of drive member 72 into aperture 82. Leaf member 70 is then inserted into cylindrical portion 86 followed by input shaft 68. A locking member 88, such as a lock washer, is placed over shaft 68 and abuts the protruding cam surface 78 to secure clutch mechanism 50 in back plate 84.

Referring to FIGS. 2 and 4, secondary support mechanism 16 is provided to supportively engage support member 12 in the event the primary support mechanism 14 fails. Secondary support mechanism 16 may be referred to as a safety backup latch assembly, because it is intended to work in conjunction with the primary support mechanism 14 and the support member 12. Secondary support mechanism 16 generally includes a tube housing 90, a latch member 92 and a lance member 94.

In a preferred embodiment, tube housing 90 is formed of a strong material such as a steel, a non-ferrous material such as aluminum or a high-strength plastic and includes back plate 84, a first structural wall 96 and a second structural wall 98. Back plate 84 and structural walls 96 and 98 are preferably formed as one member. Alternatively, back plate 84 and structural walls 96 and 98 may be formed as three separate members that are secured together during assembly of spare tire storage assembly 10. Back plate 84 is preferably L-shaped and forms a continuous structure that connects primary support mechanism 14 and secondary support mechanism 16. The L-shape configuration allows tube housing 90 to be preferably offset to one side of primary support mechanism 14 to better accommodate flexible member 48 as it pays off drum 62. Structural walls 96 and 98 are preferably spaced apart in order to form a void 100 to accommodate the movement of connection member 22. A plurality of apertures 101 are positioned in back plate 84 to receive fasteners 59 therethrough. Moreover, back plate 84 preferably includes an adapter portion 102 having at least one aperture 104 therethrough for receiving a fastener to attach spare tire storage assembly 10 to a vehicle.

Latch member 92 is preferably biased by a resilient member 108, such as a strip of spring steel. Resilient member 108 is preferably attached to first structural wall 96 by a fastener 110, such as a rivet. Latch member 92 is generally formed in an L-shaped configuration of a strong material such as a steel, a non-ferrous material such as aluminum or a high-strength plastic. Latch member 92 includes at least two apertures 112 and 114 for receiving fastener 59 and a guide member 116 respectively. Latch member 92 is rotatably secured to back plate 84 by fastener 59. Back plate 84 further includes a guide formation 118 therethrough having an arc-shaped groove with a radial centerpoint at an aperture 119 in back plate 84. The length of guide member 116 is greater than the thickness of latch member 92 permitting guide member 116 to extend beyond latch member 92 on at least one side, but preferably on both sides. Guide member 116 preferably includes an annular recess 121 that engages guide formation 118 to prevent loss of guide member 116 upon assembly. Upon connection of latch member 92 to back plate 84, guide member 116 extends though guide formation 118 and permits latch member 92 to rotate a degree substantially equal to the length of the arc.

Tube housing 90 further includes lance member 94 that is fixedly attached to second structural wall 98. Lance member 94 preferably includes a support portion 120 and a ramp 122 that extends away from a distal end 124 of second structural wall 98. Lance member 94 is designed to assist latch member 92 in supporting the load of support member 12 and spare tire assembly 18 and distributes a portion of the load onto the walls of tube housing 90 in the event the primary support mechanism 14 fails.

Referring to FIGS. 1 and 2, spare tire storage system 10 further includes a front plate 126 formed substantially similar to the L-shaped profile of back plate 84. Front plate 126 includes a flanged portion 128 having at least one aperture 130 therethrough that receives a fastener (not shown) to secure spare tire storage assembly 10 to a vehicle. Front plate 126 further includes an aperture 132 therethrough to allow passage of a distal end 134 of input shaft 68. A plurality of apertures 136 are positioned in front plate 126 to allow passage of fasteners 59 in order to secure front plate 126 to primary support mechanism 14 and the secondary support mechanism 16. Front plate 126 further includes a guide formation 138, that is substantially similar to guide formation 118 in back plate 84, to guide the rotational movement of latch member 92. Upon assembly of storage system 10, guide member 116 protrudes out of guide formation 118 a distance sufficient to engage release member 17. A stop member 140 is preferably included on the surface of front plate 126 to limit the rotation movement of release member 17.

Referring to FIGS. 1 and 2, release member 17 includes an arm portion 142 having a preferably curved hook portion 144 and an attachment portion 146. In a preferred embodiment, arm portion 142 and attachment portion 146 are integrally formed of a strong material such as a steel, a non-ferrous material such as aluminum or a high-strength plastic. Attachment portion 146 is preferably semi-circular in design having an inside diameter equal to or preferably slightly smaller than the outside diameter of a receiving formation 148 on input shaft 68, as shown in FIG. 2. Release member 17 is preferably secured to receiving formation 148 of input shaft 68 by a slip-fit engagement. During assembly, attachment portion 146 expands over receiving formation 148 on input shaft 68 and resiliently contracts back to secure release member 17 to input shaft 68. Receiving formation 148 preferably includes at least one flat 150 that is designed to enhance the transfer of torque between input shaft 68 and release member 17 as input shaft 68 rotates.

Operation of the inventive spare tire storage assembly 10 will be described with reference to FIGS. 1, 2, 5 and 6. A spare tire assembly 18 may be stowed beneath a vehicle by first inserting the separated base 20 and connecting member 22 into hub portion 30 of the spare tire assembly 18. Once the components of support member 12 have been inserted, the connecting member 22 may be inserted into aperture 28 in base 20. In this configuration, the support member engages spare tire assembly 18 allowing tire assembly 18 to be lifted to a "stowed" position in a vehicle.

Figure 5:
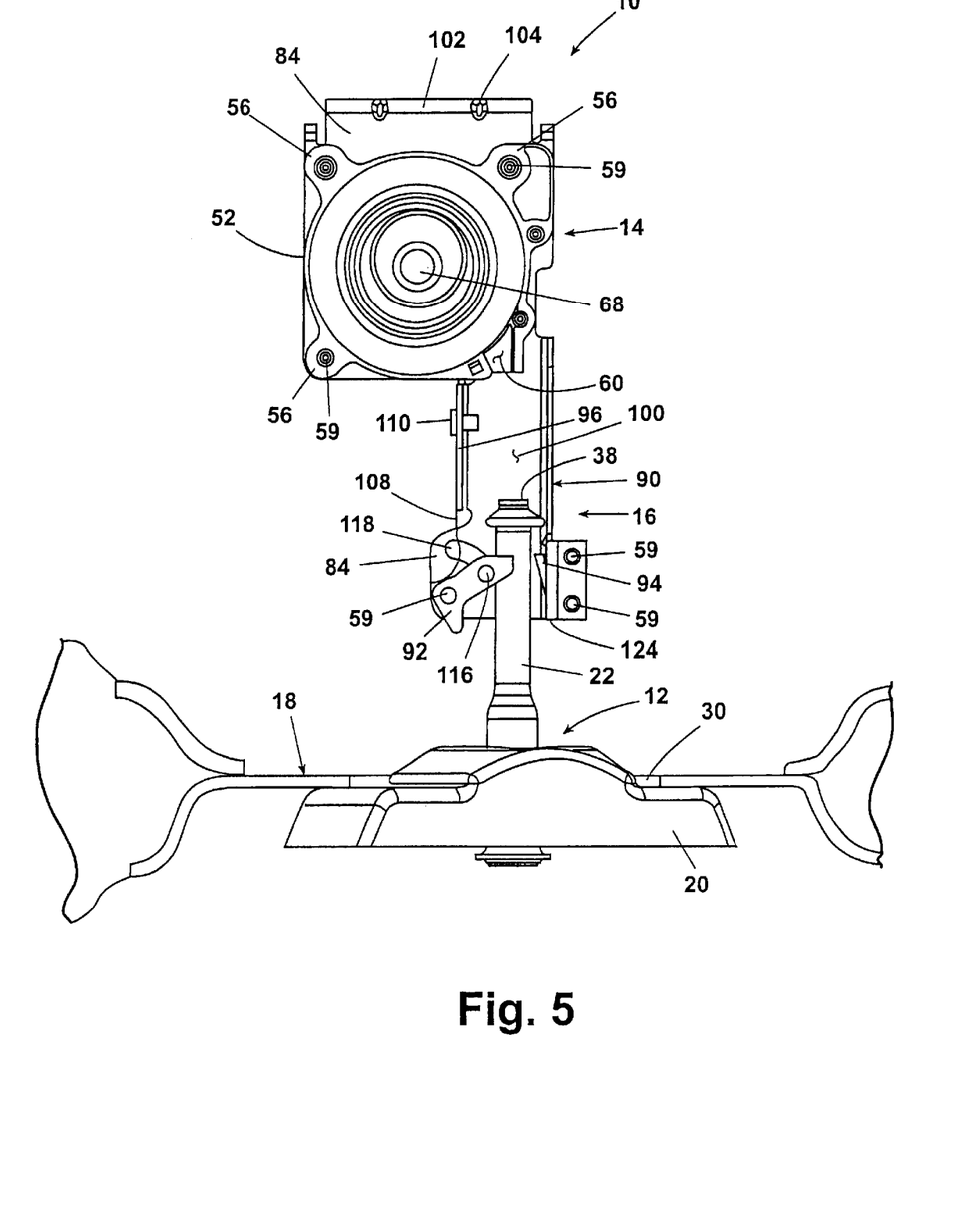
FIG. 5 is a front view of the spare tire storage system showing the relative position of the components in the "stowed" position with the release member, front plate and drum assembly removed.

Referring to FIGS. 1, 2 and 5, in order to stow spare tire assembly 18, the user causes rotation of the input shaft 68 in a direction the winds flexible member 48 onto drum 62. If the input torque required to turn input shaft 68 is below a predetermined level, such as approximately 30 Nm, leaf member 70 does not deform and allows the cam portion 76 of input shaft 68 to transfer torque to the eccentric drive member 72 causing it to rotate. Protruding cam surface 78 transfers eccentric rotational motion to wobble gear 64 causing wobble gear 64 to wobble about the recess 63 in drum 62. The difference in the one gear tooth between wobble gear 64 and recess 63 causes a speed reduction but increases the torque transfer between wobble gear 64 and drum 62. This "taumel" effect causes drum 62 to rotate in a direction opposite the rotation of shaft 68 while at the same time providing a mechanical advantage.

The same rotation of input shaft 68 also causes release member 17 to rotate in a direction away from guide member 116. As flexible member 48 is wound onto drum 62, support member 12 and spare tire assembly 18 travel toward secondary support mechanism 16. As spare tire assembly 18 nears secondary support mechanism 16, connecting end 38 of connection member 22 forces latch member 92 to pivot to a position that allows connecting end 38 of connection member 22 to pass by lance member 94 unobstructed. As connecting end 38 passes latch member 92 and lance member 94, resilient member 108 forces latch member 92 back to the original position as shown in FIG. 5. In this configuration, should primary support mechanism 14 or flexible member 48 fail, support member 12 and spare tire assembly 18 would drop until flange 45 of connecting end 38 engaged latch member 92 and lance member 94. In this position, connection member 22 remains in the "stowed" position within tube housing 90. Moreover, a portion of the load of support member 12 and spare tire assembly 18 is transferred to the back plate 84, structural walls 96 and 98, and front plate 126.

Upon complete insertion of connection member 22 into tube housing 90, spare tire assembly 18 comes into contact with the vehicle underbody causing the torque needed to rotate input shaft 68 to exceed the predetermined limit. The excessive torque forces the cam portion of input shaft 68 to slip in resilient leaf member 70 permitting input shaft 68 to rotate freely in eccentric drive member 72. The free rotation of input shaft 68 prevents damage to clutch mechanism 50 if the user continues to rotate input shaft 68.

Figure 6:
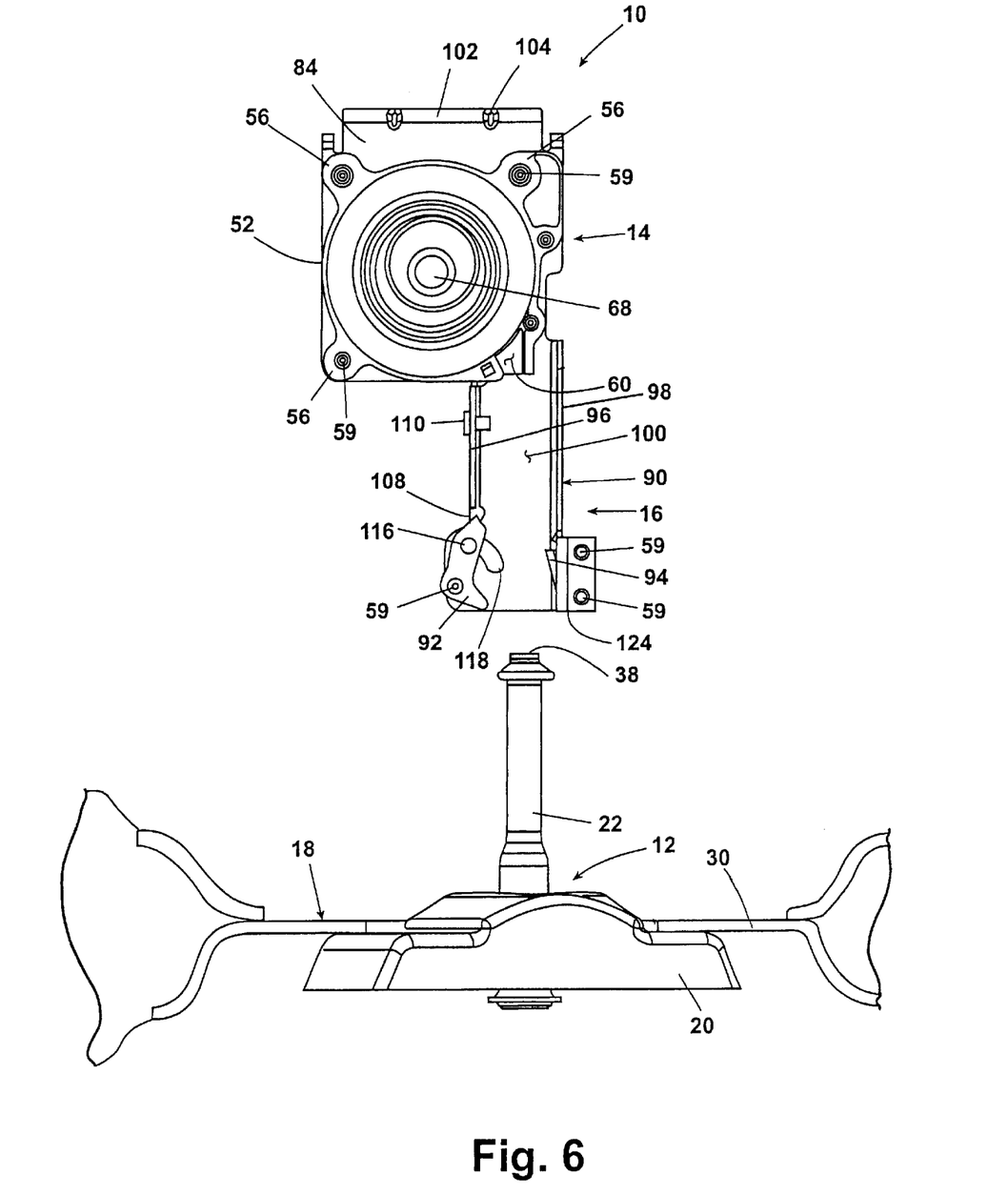
FIG. 6 is a front view of the spare tire storage system showing the relative position of the components in the "released" position with the release member, front plate and drum assembly removed.

Referring to FIGS. 1, 2 and 6, in order to release and lower spare tire assembly 18, the user causes the input shaft 68 to rotate in a direction that unwinds flexible member from drum 62. The rotation of input shaft 68 causes the release member 17 to rotate until it engages the outwardly extending guide member 116, thereby forcing guide member 116 and the attached latch member 92 to pivot outwardly away from connection member 22. As input shaft 68 rotates, release member 17 slips on receiving formation 148 of input shaft 68. Flat 150 and the friction created between input shaft 68 and release member 17 cause sufficient torque to be transferred to release member 17 to force latch member 106 to pivot. In this configuration, connecting end 38 of connection member 22 is allowed to pass by latch member 92 and lance member 94 as it exits tube housing 90. Additional rotation of input shaft 68 causes the support member 12 and spare tire assembly 18 to be lowered to the ground, whereby the support member 12 may be removed from spare tire assembly 18.

The inventive features of secondary catch mechanism 16 prevent spare tire assembly 18 from being released in the event flexible member 48 fails during storage. As described above, failure of flexible member 48 causes the connection member to engage latch member 92 and lance member 94. If a user causes the input shaft 68 to rotate in a direction intending to release spare tire assembly 18, release member 17 rotates until it engages latch member 92. The user must provide torque to release member 17 that is sufficient to pivot latch member 92 against the weight of spare tire storage assembly 18. However the torque need to overcome the weight of connection member 22 and spare tire assembly 18 is beyond the capabilities of clutch mechanism 50. The excessive torque forces the cam portion of input shaft 68 to slip in resilient leaf member 70 permitting input shaft 68 to rotate freely in eccentric drive member 72.

The inventive features of spare tire storage assembly 10 make it ideal for preventing the loss of a spare tire assembly in the event the primary support mechanism 14 or flexible member 48 fail. However, the inventive features of spare tire storage assembly 10 may be used in any application in which a secondary support mechanism is critical to assure the continued support of a load. For example, a winch assembly used to hoist construction materials across a highway without traffic interruption may employ the inventive features of the spare tire storage assembly 10 to prevent an accident in the event the winch assembly or support cable fails.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A support mechanism for use in conjunction with a winding mechanism for letting out and taking up a flexible member that selectively moves a load from a stowed position to a released position, said support mechanism including a:
    a housing for receiving a load carrying support member that is attached to said flexible member;
    a resiliently biased latch member that may be selectively moved from a first engaged position to a second unengaged position; and
    a lance member proximate said latch member;
    whereby, when said load is moved to the stowed position, a portion of said support member is moved into a position above said latch member and said lance member such that, if said winding mechanism or said flexible member fail, said latch member and said lance member engage said portion of said support member to retain said load in the stowed position.

2. The assembly of claim 1, wherein said flexible member comprises a cable.

3. The assembly of claim 1, wherein said housing includes a back plate having secured thereto a first and second structural wall.

4. The assembly of claim 3, wherein a resilient member is secured to said first structural wall to bias said latch member.

5. The assembly of claim 3, wherein said back plate includes a formation formed therethrough for guiding the movement of said latch member.

6. The assembly of claim 1, wherein said support member includes a connection member that cooperates with a base to carry said load.

7. The assembly of claim 6, wherein said support member includes a flange, whereby when said load is moved to the stowed position, said flange engages said latch member causing said latch member to pivot to said second unengaged position to allow said connection member to be inserted into said support mechanism.

8. The assembly of claim 1, further including a release member in communication with said winding mechanism.

9. The assembly of claim 8, wherein said release member includes an arm member that rotatably engages said latch member to move said latch member from said first engaged position to said second unengaged position to allow said support member and said load to be lowered to a release released position.

10. The assembly of claim 9, wherein said release member further includes an attachment portion that is in slip-fit engagement with a receiving formation on a shaft connected to said winding mechanism.

11. A spare tire storage assembly for stowing and releasing a spare tire, said spare tire storage assembly comprising:
    a support member attached to a flexible member for carrying said spare tire;
    a primary support mechanism for letting out and taking up said flexible member that selectively moves said support member and said spare tire from a stowed position to a released position;
    a secondary support mechanism positioned proximate said primary support mechanism, said secondary support mechanism including a resiliently biased latch member and a lance member;
    a release member in communication with said primary support mechanism for rotatably engaging said biased latch member to move said latch member from a first engaged position to a second unengaged position; and
    whereby, when said spare tire is moved to the stowed position, the support member is moved into a position above said latch member and said lance member such that, if said primary support mechanism or said flexible member fail, said latch member and said lance member engage said support member to retain said spare tire in the stowed position.

12. The assembly according to claim 11, wherein said support member includes a compressible member disposed between a connection member and a base to maintain engagement between said spare tire and a vehicle underbody.

13. The assembly of claim 12, wherein said connection member includes a flanged connecting end, whereby when the support member and spare tire are moved to the stowed position, said flanged connecting end engages said latch member causing said latch member to move to said second position to allow said connection member to be inserted into said secondary support mechanism.

14. The assembly of claim 11, wherein said primary support mechanism includes a housing that receives a drum assembly, said drum assembly including a drum having said flexible member wound thereon.

15. The assembly of claim 14, wherein said primary support mechanism further includes a clutch mechanism that permits rotation of said drum when the torque required to rotate said drum is less than a predetermined level.

16. The assembly of claim 15, wherein said clutch mechanism includes a shaft therethrough for supplying torque to drive the drum assembly.

17. The assembly of claim 11, wherein said secondary support mechanism includes a back plate having secured thereto a first and second structural wall.

18. The assembly of claim 17, wherein a resilient member is secured to said first structural wall to bias said latch member.

19. The assembly of claim 11, wherein said release member includes an attachment portion that is in slip-fit engagement with a receiving formation on a shaft, and an arm member that rotatably engages a guide member on said latch member to move said latch member to said second unengaged position.

20. A method of stowing and releasing a spare tire assembly beneath a vehicle, comprising the steps of:

providing an apparatus having a primary support mechanism for letting out and taking up a flexible member that selectively moves a spare tire from a stowed position to a released position, and a secondary support mechanism for securing said spare tire assembly should said primary support mechanism or said flexible member fail, said secondary support system including a resiliently biased latch member and a lance member;

securing said spare tire assembly on a support member;

rotating an input shaft in a direction that winds said flexible member into said primary support mechanism until said spare tire assembly is lifted to a stowed position within said secondary support mechanism; and rotating said input shaft in a direction that unwinds said flexible member from said primary support mechanism and forces a release member to engage and move said latch member permitting said spare tire assembly to be lowered to a released position.

* * * * *